UNITED STATES PATENT OFFICE.

SAMUEL CRUMP, OF MONTCLAIR, NEW JERSEY.

FOOD PRODUCT AND METHOD OF MAKING THE SAME.

SPECIFICATION forming part of Letters Patent No. 479,402, dated July 26, 1892.

Application filed November 9, 1891. Serial No. 411,297. (No specimens.)

*To all whom it may concern:*

Be it known that I, SAMUEL CRUMP, a citizen of the United States, and a resident of Montclair, in the county of Essex and State of New Jersey, have invented certain new and useful Improvements in Food Products from Cocoanut and Methods of Manufacturing the Same, of which the following is a specification.

The invention consists in a new article of manufacture—viz., a product of cocoanut containing all the natural ingredients of the nut less the fibrous portions thereof reduced to a liquid, a paste, or a granular or other condensed or "desiccated" form and in condition for commercial purposes; and said invention further consists in methods, hereinafter described, for the production of said new article of manufacture.

One of the main objects of the invention is to produce an article embodying the nutritive and other desirable ingredients of the cocoanut and which shall be perfectly digestible and in condition for use either in cooking, flavoring, or confections or for any of the purposes for which the present shredded or cut cocoanut is employed; and in carrying my invention into effect I absolutely deprive the finished article of the tough indigestible fiber present in the cocoanut and in the prepared desiccated cocoanut now an article of sale and preserve the flavor and nutritious elements of the nut in their natural condition.

In carrying out my invention I first grind, crush, or finely shred the meat of the cocoanut, including, by choice, the brown coating in direct contact therewith, and then add to the product thus obtained a proportion of tepid or cold water, preferably distilled, allowing the whole to stand for about one-half hour, or until the water has caused the particles of the nut to swell. The exact proportion of the water and comminuted nut is not important; but satisfactory results will be obtained if to one pound of the nut is added one pint of the water. After the comminuted nut and water have stood the requisite length of time the mass is agitated and then strained under pressure for the purpose of causing the water to separate from the fiber and carry with it the oil and other elements of the nut less the fiber in their natural condition. If the remaining fiber of the nut is not entirely deprived of its nutritive ingredients by the once straining under pressure, I again add water to it and after the same has stood the necessary length of time subject the mass to a further kneading, agitating, and straining under pressure, and, if necessary, repeat the operation until all the extractible matter of the nut capable of separation from the fiber has been carried away by the water.

The liquor resulting from the preceding operations contains the oil and other desirable elements of the nut, but practically none of the indigestible fiber thereof, and this liquor with, by preference, what is known as the "milk" of the cocoanut added is thereafter subjected to evaporation in a vacuum-pan, in order that the surplus aqueous particles may be removed and a pure extract of the nut less the fiber secured. The heat under which the liquor will be evaporated will vary; but it may be stated that the product will be satisfactory where the heat is 55° centigrade and the vacuum twenty-eight inches.

The cocoanut in the process of treatment becomes practically sterilized by the exposure to the heat in the vacuum-pan, so that the decomposition of the oil in the cocoanut is arrested.

During the evaporation in the vacuum-pan I prefer to add sugar to the liquor, in order to preserve the oil and prevent decomposition thereafter. The consistence of the resultant product will depend partly on the quantity of sugar thus added during the evaporation, and hence this product may be given a liquid or semi-liquescent form, or the condition of a thick paste, and as such marketed. If, however, it is desired that the product be marketed in a desiccated form, a larger proportion of sugar will be added to the liquor during evaporation, and thereafter the thick product leaving the condenser will be dried in a drying-pan and while drying agitated, the result being that the product will then be in dry granular form ready for use.

It will be observed that the product attained by means of the method above described is an extract containing all of the valuable component parts of the cocoanut less the fiber thereof, and that said parts are preserved in their natural flavor and condensed in form suitable for all the uses to which the ordinary cocoanut is applied, as well as for uses to which the ordinary cocoanut is not applicable. In addition I present an article of manufacture which is wholesome and digestible and distinctly new and, while possessing all of the essential characteristics of the ripe cocoanut, lacks the indigestible, tasteless, and injurious fiber thereof.

What I claim as my invention, and desire to secure by Letters Patent, is—

1. As a new article of manufacture, a non-fibrous food compound composed of the natural ingredients of the cocoanut deprived of the fibrous portions of the nut, having added thereto sugar and the milk of the cocoanut, and in a condensed or desiccated form, substantially as hereinbefore set forth.

2. As a new article of manufacture, a non-fibrous food compound having as component parts the natural ingredients of the cocoanut deprived of the fibers thereof, with a proportion of sugar, and in a condensed or desiccated form.

3. The method of preparing a product of cocoanut hereinbefore described, which consists in crushing, grinding, or dividing the nut, adding thereto the milk of the cocoanut, sugar, and a proportion of water, straining the mass, and subjecting the liquor to evaporation *in vacuo*.

Signed at New York, in the county of New York and State of New York, this 7th day of November, A. D. 1891.

SAMUEL CRUMP.

Witnesses:
    CHAS. C. GILL,
    ED. D. MILLER.